United States Patent [19]
Fredell et al.

[11] Patent Number: 5,375,413
[45] Date of Patent: Dec. 27, 1994

[54] AIR BAFFLE APPARATUS

[75] Inventors: Gary D. Fredell, Two Rivers; Donald D. Mondul, Milwaukee, both of Wis.

[73] Assignee: Paragon Electric Company, Inc., Two Rivers, Wis.

[21] Appl. No.: 178,648

[22] Filed: Jan. 7, 1994

[51] Int. Cl.$^5$ ............................................. F25D 17/06
[52] U.S. Cl. ................................. 62/187; 137/625.33; 251/129.1
[58] Field of Search ...................... 62/187; 251/129.1; 137/625.33; 454/324, 334

[56] References Cited

U.S. PATENT DOCUMENTS

| | | | |
|---|---|---|---|
| 3,645,108 | 2/1972 | Houk | 62/187 |
| 4,276,754 | 7/1981 | Ty | 62/187 |
| 4,688,393 | 8/1987 | Linstromberg et al. | 62/187 |
| 4,735,057 | 4/1988 | Janke | 62/187 |
| 4,819,442 | 4/1989 | Sepso et al. | 62/187 |
| 4,843,833 | 7/1989 | Polkinghorne | 62/187 X |
| 5,014,520 | 5/1991 | Orner et al. | 62/187 |

*Primary Examiner*—William E. Tapolcai
*Attorney, Agent, or Firm*—Foley & Lardner

[57] ABSTRACT

An improved apparatus for regulating air flow between a cooling unit and a compartment in a refrigeration system includes a first baffle element having an array of first air passages, and a second baffle element having an array of second air passages. The first baffle element and the second baffle element are slidingly engaged and are slidingly positionable with respect to each other. The first air passages and the second air passages cooperate to pass air through the apparatus when the first baffle element and the second baffle element are in a first position, and the first air passages and the second air passages cooperate to substantially block air from passing through the apparatus when the first baffle element and the second baffle element are in a second position. The apparatus further includes an actuator coupled with the first baffle element and the second baffle element for slidingly positioning the baffle elements, the actuator having an actuated state and an idle state. The apparatus further includes a standoff structure for establishing a predetermined separation distance between the first baffle element and the second baffle element proximal to the standoff structure. The first baffle element and the second baffle element are in substantially adjoining relation distal from the standoff structure when the actuator is in the idle state and are substantially the separation distance apart distal from the standoff structure when the actuator is in the actuated state.

19 Claims, 3 Drawing Sheets

FIG. 1a  CLOSED POSITION

FIG. 2a  TRANSIENT POSITION

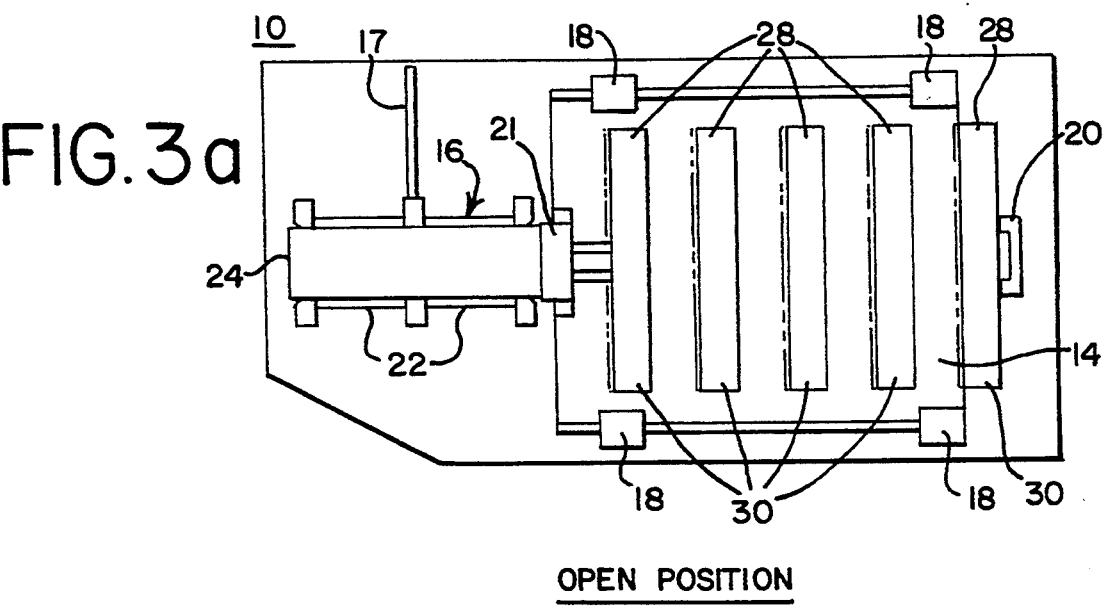
OPEN POSITION
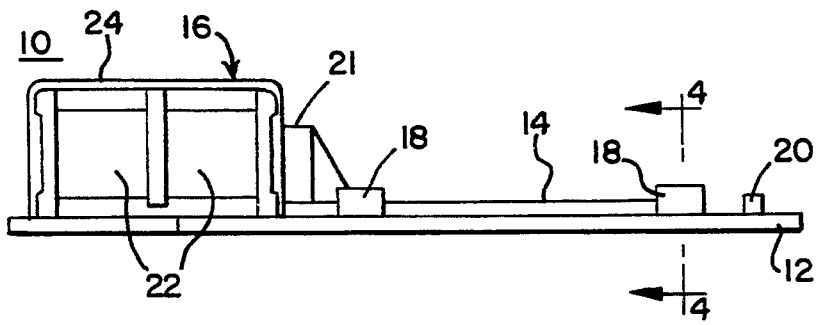
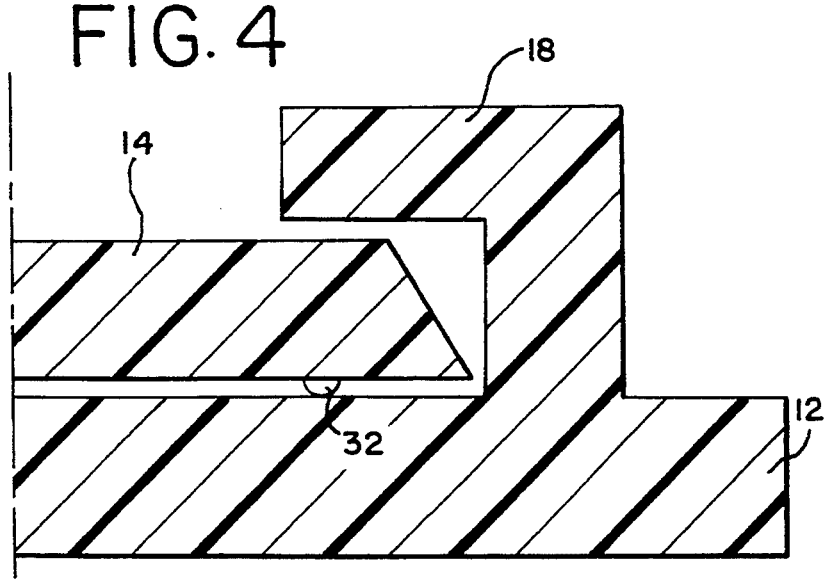

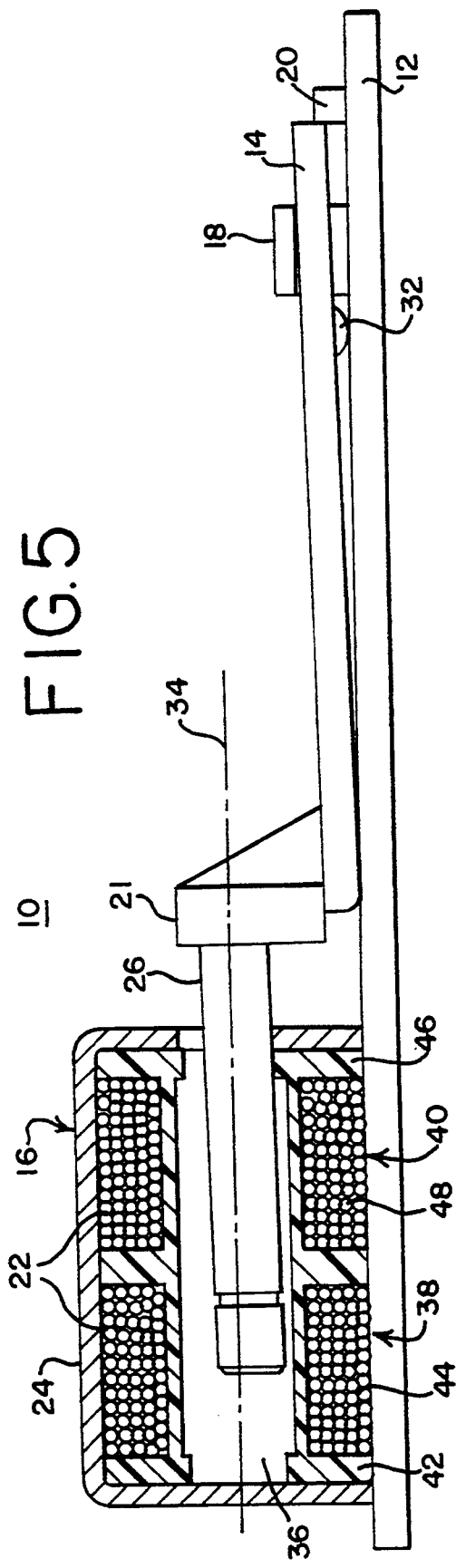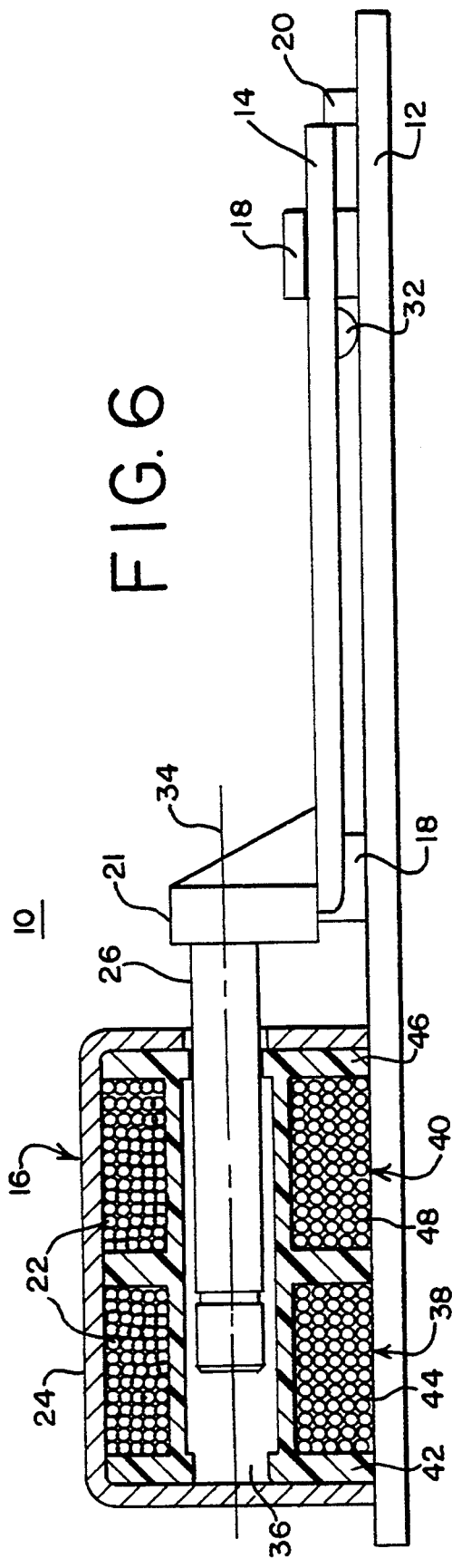

AIR BAFFLE APPARATUS

BACKGROUND OF THE INVENTION

The invention relates generally to an improved apparatus regulating air flow between a cooling unit and a compartment in a refrigeration system. In particular, the invention relates to an improved air baffle apparatus.

Conventionally, a refrigeration system provides a single refrigerating or cooling unit in a freezer section of the system for providing cold air to the freezer section. A separate one or more refrigeration compartments is maintained at a cool but not freezing temperature for refrigerating items contained in the compartment. The refrigeration compartment is in fluid communication with the cooling unit, usually through air ducts within the walls of the refrigeration system. A thermostatic control monitors the temperature within the refrigeration compartment controls the opening and closing of an air baffle apparatus within the air duct intermediate the cooling unit and the refrigeration compartment. If the refrigeration compartment becomes warmer than a predetermined temperature, the air baffle apparatus is opened to allow cool air to flow from the cooling unit to the refrigeration compartment; if the refrigeration compartment is sufficiently cool according to predetermined parameters, the air baffle apparatus is closed to preclude air flow from the cooling unit to the refrigeration compartment.

There are occasions when moisture enters the refrigeration compartment, such as when a user opens a door to gain access to the interior of the compartment. Such moisture can collect on an air baffle apparatus and react to the presence of cold air from the cooling unit to form ice. The ice may build up sufficiently to interfere with the operation of the air baffle apparatus, freezing the moving parts of the apparatus and preventing movement of the parts to effect an open or closed orientation to control flow of cold air from the cooling unit to the refrigeration compartment.

Prior art solutions to the problem of ice build-up on moving parts of an air baffle have included provision of spacers intermediate the moving parts to maintain the parts in spaced relation, as disclosed in U.S. Pat. No. 4,903,501 for a "Refrigerator Air Control Heated Baffle" to James O. Harl. A problem with such provision of spacers is that no active motion is available to break up ice formations other than the normal actuation movement of the air baffle apparatus. Thus, if sufficient ice is built up to bridge the gap in the space between the moving parts of the air baffle, only the normal operating movement of the air baffle is available to overcome the binding action of the ice upon the moving parts.

It would be useful to provide an air baffle apparatus for regulating air flow between the cooling unit and a compartment in a refrigeration system which has improved action for breaking ice built up on the air baffle.

SUMMARY OF THE INVENTION

The invention is an improved apparatus for regulating air flow between a cooling unit and a compartment in a refrigeration system and, in particular, is an improved air baffle apparatus for use in refrigeration systems comprising a first baffle element having an array of first air passages, and a second baffle element having an array of second air passages. The first baffle element and the second baffle element are slidingly engaged and are slidingly positionable in a plurality of positions. The first air passages and the second air passages cooperate to pass air through the apparatus when the first baffle element and the second baffle element are in a first position of the plurality of positions, and the first air passages and the second air passages cooperate to substantially block air from passing through the apparatus when the first baffle element and the second baffle element are in a second position of the plurality of positions. The apparatus further includes an actuator coupled with the first baffle element and the second baffle element for slidingly positioning the baffle elements, the actuator having an actuated state and an idle state. The apparatus further includes a standoff structure for establishing a predetermined separation distance between the first baffle element and the second baffle element proximal to the standoff structure. The first baffle element and the second baffle element are in substantially adjoining relation distal from the standoff structure when the actuator is in the idle state and are substantially the separation distance apart distal from the standoff structure when the actuator is in the actuated state.

It is, therefore, an object of the present invention to provide an improved apparatus for regulating air flow between a cooling unit and a compartment in a refrigeration system, and, in particular, to provide an improved air baffle apparatus for use in a refrigeration system, which provides enhanced action for break up of ice intermediate moving elements of the apparatus.

Further objects and features of the present invention will be apparent from the following specification and claims when considered in connection with the accompanying drawings illustrating the preferred embodiment of the invention.

DETAILED DESCRIPTION OF THE DRAWINGS

FIG. 3 illustrates an air baffle apparatus, configured according to the preferred embodiment of the present invention, in an open position.

FIG. 4 illustrates a section view of a detail of the air baffle apparatus taken along Section 4—4 of FIG. 3.

FIG. 5 illustrates, in partial section side view, an air baffle apparatus configured according to the preferred embodiment of the present invention with the actuator in the idle state.

FIG. 6 illustrates, in partial section side view, an air baffle apparatus configured according to the preferred embodiment of the present invention with the actuator in the actuated state.

DETAILED DESCRIPTION OF THE INVENTION

Figure 1B:
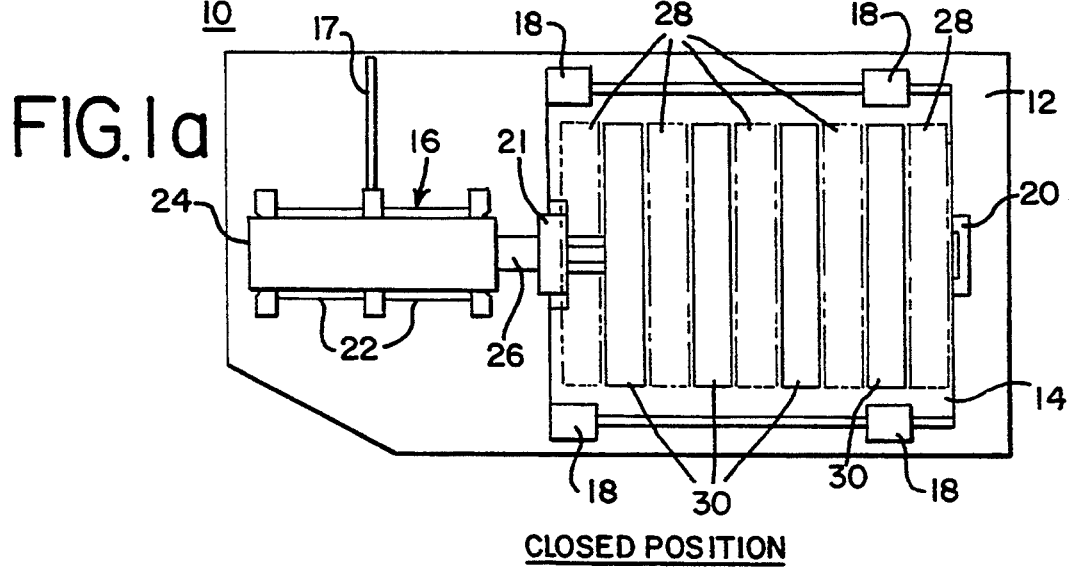
FIG. 1 illustrates an air baffle apparatus, configured according to the preferred embodiment of the present invention, in a closed position.
Figure 1B:
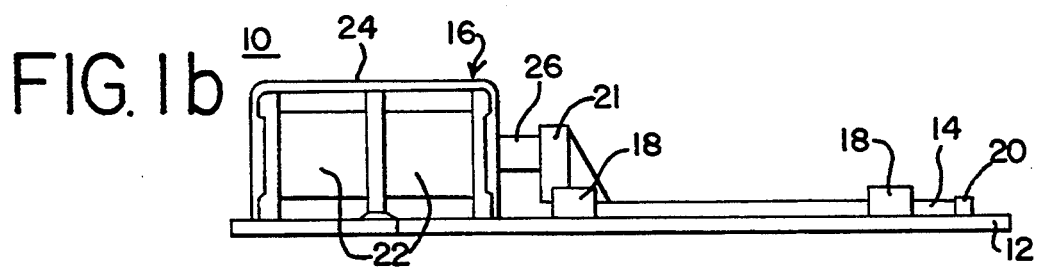

FIG. 1 illustrates an air baffle apparatus, configured according to the preferred embodiment of the present invention, in a closed position. In FIG. 1, FIG. 1(a) illustrates an air baffle apparatus 10 in top plan view; FIG. 1(b) illustrates air baffle apparatus 10 in a side elevation view. Air baffle apparatus 10 includes a first baffle element 12, a second baffle element 14, and an actuator 16. First baffle element 12 and second baffle element 14 are substantially adjacent to each other and slidibly engaged by nesting engagement of second baffle element 14 within a plurality of baffle guides 18. A stop structure 20 abuttingly restricts movement of second baffle element 14 when air baffle apparatus 10 is in its closed position.

Actuator 16 preferably includes a solenoid comprising solenoid coils 22 contained in a case structure 24, and a solenoid armature 26. Electrical power is supplied to actuator 16 via an electrical contact assembly 17. Armature 26 is attached to a stop structure 21 on second baffle element 14.

First baffle element 12 has an array of first apertures 28, and second baffle element 14 has a plurality of second apertures 30. In the closed position illustrated in FIG. 1, second baffle element 14 is slidibly oriented in a position where both first apertures 28 and second apertures 30 are substantially blocked, thereby substantially precluding passage of air through air baffle apparatus 10.

In order to facilitate understanding the invention, like elements will be identified by like reference numerals in the various figures.

Figure 2B:
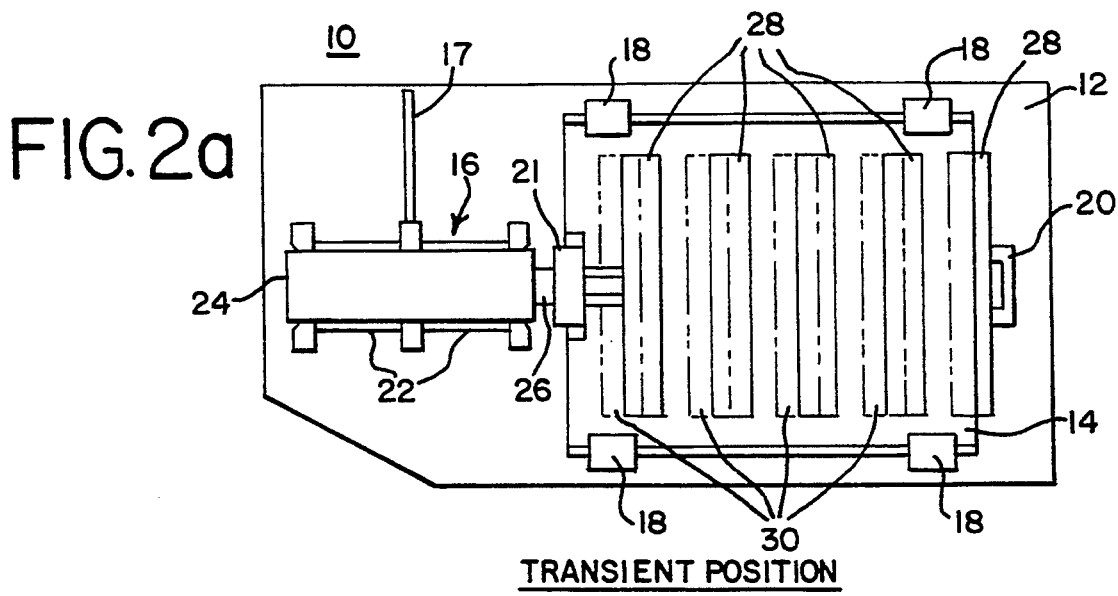
FIG. 2 illustrates an air baffle apparatus, configured according to the preferred embodiment of the present invention, in a transient position between its open position and its closed position.
Figure 2B:
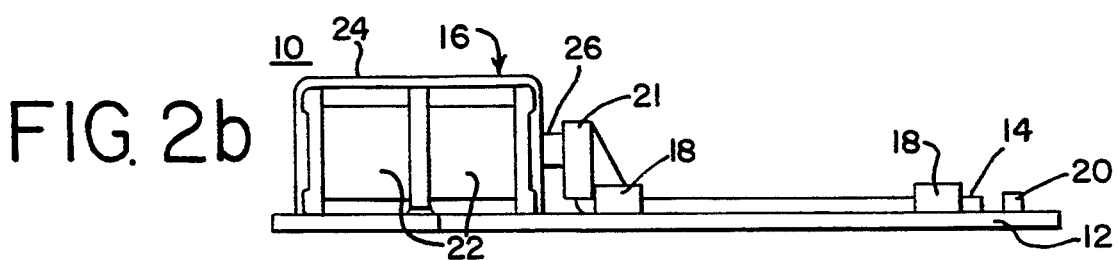

FIG. 2 illustrates an air baffle apparatus, configured according to the preferred embodiment of the present invention, in a transient position between its open position and its closed position.

In FIG. 2, FIG. 2(a) illustrates air baffle apparatus 10 in top plan view; FIG. 2(b) illustrates air baffle apparatus 10 in a side elevation view. In the transient position illustrated in FIG. 2, armature 26 has been partially drawn within solenoid coils 22, thereby moving second baffle element 14 to the left of the position in which it was illustrated as occupying in FIG. 1 (the closed position). The movement of second baffle element 14 relative to first baffle element 12 unmasks a portion of first apertures 28 and second apertures 30 as first apertures 28 and second apertures 30 are situated partially in register.

In practice, air baffle apparatus 10 is preferably moved to either its closed position or its open position by actuation of actuator 16 in response to electrical signals provided at electrical contact assembly 17. Most preferably, actuator 16 is periodically (e.g., about once per second) pulsed appropriately to urge second baffle element 14 toward either an open position or a closed position, depending upon whether it is desired that cold air flow to a compartment or not flow to a compartment.

FIG. 3 illustrates an air baffle apparatus, configured according to the preferred embodiment of the present invention, in an open position.

In FIG. 3, FIG. 3(a) illustrates air baffle apparatus 10 in top plan view; FIG. 3(b) illustrates air baffle apparatus 10 in a side elevation view. In FIG. 3, actuator 16 has been appropriately actuated to draw armature 26 (not shown in FIG. 3) substantially within solenoid coils 22. As a result of actuation of actuator 16, stop structure 21 is substantially fully in abutting relation with actuator 16, second baffle element 14 has moved further to be left with respect to first baffle element 12 then was illustrated in FIGS. 1 and 2. First apertures 28 are substantially fully unmasked so that first apertures 28 and second apertures 30 are substantially in register and, therefore, allow air passage through air baffle apparatus 10.

FIG. 4 illustrates a section view of a detail of the air baffle apparatus taken along Section 4—4 of FIG. 3. In FIG. 4, first baffle element 12 is illustrated as integrally including baffle guide 18 and being separated from second baffle element 14 by a stand-off structure 32. Stand-off structure 32 is preferably a hemispherical bead-like structure integrally formed with either second baffle element 14 (as shown in FIG. 4) or integrally formed with first baffle element 12. Of course, stand-off structure 32 may be separately formed and adhered or affixed to either second baffle element 14 or first baffle element 12. Preferably, stand-off structure 32 may be placed adjacent each side of the coextensive area paralleled by first baffle element 12 and second baffle element 14. Most preferably, placement of stand-off structures 32 will be off-center from a balance point of second baffle element 14 upon first baffle element 12 so that second baffle element 14 will have a tendency to be at rest in a non-parallel orientation with respect to first baffle element 12, absent any outside forces applied to air baffle apparatus 10.

FIG. 5 illustrates, in partial section side view, an air baffle apparatus configured according to the preferred embodiment of the present invention with the actuator in its idle state. In FIG. 5, only one baffle guide 18 is illustrated in order to more clearly reveal the relationship between second baffle element 14 and first baffle element 12 when no power is applied to actuator 16 (i.e., when actuator 16 is in its idle state). Thus stand-off structure 32 maintains a separation distance between second baffle element 14 and first baffle element 12 proximal to stand-off structure 32. However, distal from stand-off structure 32 second baffle element 14 is in substantially adjoining relation with first baffle element 12. In such a situation, armature 26 is not aligned with axis 34 of cavity 36 within solenoid coils 22. Preferably, solenoid coils 22 comprise two actuator coils 38, 40. Actuator coil 38 is comprised of a bobbin 42 surrounding cavity 36 and is itself surrounded by electrical windings 44 which are electrically attached with electrical conduct assembly 17 (not shown in FIG. 5). Similarly, actuator coil 40 is comprised of a bobbin 46 surrounding cavity 36 and is itself surrounded by electrical windings 48 which are electrically connected with electrical contact assembly 17 (not shown in FIG. 5). Bobbins 42, 46 are preferably molded of plastic, and may comprise a single unitary structure. Electrical contact assembly 17 is configured so that selective application of power to the contacts of electrical contact assembly 17 may selectively actuate either actuator 38 or actuator coil 40. An appropriate electrical contact assembly structure to effect such selective actuation of a plurality of coils is well-known by those skilled in the art and does not require illustration.

One of actuator coils 38, 40 may be selectively actuated to urge armature 26 to the left in FIG. 5 to draw armature 26 within cavity 36 and establish the open position for air baffle apparatus 10 (see FIG. 3). The other of actuator coils 38, 40 may be selectively actuated to urge armature 26 to the right in FIG. 5, out of cavity 36 and against stop 20 to establish the closed position for air baffle apparatus 10 (see FIG. 1).

FIG. 6 illustrates, in partial section side view, an air baffle apparatus configured according to the preferred embodiment of the present invention with the actuator in its actuated state.

As is well known by those skilled in the art, when power is applied to a solenoid actuator an electromagnetic field is established by the actuation coil. Further, when an armature is introduced into the electromagnetic field established by an actuation coil, the armature tends to be centered within the electromagnetic field.

Thus, when either actuator coil 38 or actuator coil 40 (depending upon whether one wishes to position air baffle apparatus 10 in an open position or closed position) is actuated, the establishment of the electromagnetic field by actuation coil 38, 40 strongly tends to center armature 26 on axis 34 within cavity 36. It is this action which is advantageously employed by the apparatus of the present invention to enhance its ice-breaking action. Thus, when power is applied to either actuator coil 38 or actuator coil 40 of actuator 16 (see FIG. 6), armature 26 is substantially centered on axis 34 within cavity 36 since actuator coils 38, 40 are substantially coaxial about axis 34. There is thereby effected a levering or rocking of second baffle element 14 with stand-off structure 32 acting as a fulcrum to establish the end of second baffle element 14 distal from stand-off structure 32 at substantially the same stand-off distance from first baffle element 12 as is established between second baffle element 14 and first baffle element 12 proximal to stand-off structure 32.

As previously described, in the preferred mode of operation of air baffle apparatus 10, positioning of air baffle apparatus 10 in either its open position or closed position is effected and maintained by periodic pulsing of actuator 16. Such periodic pulsing establishes periodic alternate establishment and relaxation of an electromagnetic field which intermittently acts to center armature 26 on axis 34 within cavity 36. As a result of such intermittent electromagnetic action, a repeated rocking or levering motion is exerted on second baffle element 14, thereby enhancing the break up of any ice which may have formed intermediate second baffle element 14 and first baffle element 12.

The preferred embodiment of actuator 16 is, as illustrated, a pair of actuator coils 38, 40. Of course, any actuator mechanism would suffice which involves action (e.g., a mechanical camming action) to center an armature 26 (or a similar structure) on an axis such as axis 34 to substantially position second baffle element 14 parallel with first baffle element 12 and effect the described rocking motion on stand-off structure 32 as a fulcrum. Certainly one skilled in the art could design such a mechanical structure which could be "pulsed" or similarly periodically actuated to effect the leveraging or rocking of second baffle element 14 on the fulcrum of stand-off structure 32 in a manner similar to the action described above in connection with actuation of a solenoid-type actuator 16.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of invention which is defined by the following claims.

We claim:

1. An improved apparatus for regulating air flow between a cooling unit and a compartment in a refrigeration system; the apparatus including a first baffle element having at least one first air passage, including a second baffle element having at least one second air passage, and including an actuator for moving said first baffle element with respect to said second baffle element to selectively orient the apparatus in an open position or in a closed position; said at least one first air passage and said at least one second air passage being at least partially in a communicating relation in said open position to facilitate said air flow through the apparatus; said at least one first air passage and said at least one second air passage being substantially in a noncommunicating relation in said closed position to substantially block said air flow through the apparatus; the improvement comprising:

a standoff means for establishing a predetermined separation distance between said first baffle element and said second baffle element proximal to said standoff means, said first baffle element and said second baffle element being separated by a distance less than said predetermined separation distance distal from said standoff means when said actuator is in a first state, and said first baffle element and said second baffle element being substantially said separation distance apart distal from said standoff means when said actuator is in a second state.

2. An improved apparatus for regulating air flow between a cooling unit and a compartment in a refrigeration system as recited in claim 1 wherein said standoff means is affixed to at least one of said first baffle element and said second baffle element.

3. An improved apparatus for regulating air flow between a cooling unit and a compartment in a refrigeration system as recited in claim 1 wherein said actuator comprises a solenoid, said solenoid including at least one solenoid coil affixed to one of said first baffle element and said second baffle element, and including an armature affixed to the other one of said first baffle element and said second baffle element.

4. An improved apparatus for regulating air flow between a cooling unit and a compartment in a refrigeration system as recited in claim 2 wherein said actuator comprises a solenoid, said solenoid including at least one solenoid coil affixed to one of said first baffle element and said second baffle element, and including an armature affixed to the other one of said first baffle element and said second baffle element.

5. An air baffle apparatus for use in a refrigeration system; the apparatus comprising:

a first baffle element; said first baffle element having an array of first air passages;

a second baffle element; said second baffle element having an array of second air passages; said first baffle element and said second baffle element being slidably engaged and being slidably positionable in a plurality of positions; said first air passages and said second air passages cooperating to pass air through the apparatus when said first baffle element and said second baffle element are in a first position of said plurality of positions; said first air passages and said second air passages cooperating to substantially block air from passing through the apparatus when said first baffle element and said second baffle element are in a second position of said plurality of positions;

an actuator means coupled with said first baffle element and with said second baffle element for slidably positioning said first baffle element and said second baffle element, said actuator means having an actuated state and an idle state; and a standoff means for establishing a predetermined separation distance between said first baffle element and said second baffle element proximal to said standoff means, said first baffle element and said second baffle element being in substantially adjoining relation distal from said standoff means when said actuator means is in said idle state, and said first baffle element and said second baffle element being substantially said separation distance apart distal from said standoff means when said actuator means is in said actuated state.

6. An air baffle apparatus for use in a refrigeration system as recited in claim 5 wherein said standoff means is affixed to at least one of said first baffle element and said second baffle element.

7. An air baffle apparatus for use in a refrigeration system as recited in claim 5 wherein said actuator comprises a solenoid, said solenoid including at least one solenoid coil affixed to one of said first baffle element and said second baffle element, and including an armature affixed to the other one of said first baffle element and said second baffle element.

8. An air baffle apparatus for use in a refrigeration system as recited in claim 6 wherein said actuator comprises a solenoid, said solenoid including at least one solenoid coil affixed to one of said first baffle element and said second baffle element, and including an armature affixed to the other one of said first baffle element and said second baffle element.

9. An improved apparatus for regulating air flow between a cooling unit and a compartment in a refrigeration system; the apparatus including a first baffle element having at least one first air passage, including a second baffle element having at least one second air passage, and including an actuator for moving said first baffle element with respect to said second baffle element to selectively orient the apparatus in an open position or in a closed position; said at least one first air passage and said at least one second air passage being at least partially in a communicating relation in said open position to facilitate said air flow through the apparatus; said at least one first air passage and said at least one second air passage being substantially in a noncommunicating relation in said closed position to substantially block said air flow through the apparatus; the improvement comprising:
a standoff member for establishing a predetermined separation distance between said first baffle element and said second baffle element proximal to said standoff member, said first baffle element and said second baffle element being separated by a distance less than said predetermined separation distance distal from said standoff member when said actuator is in a first state, and said first baffle element and said second baffle element being substantially said separation distance apart distal from said standoff member when said actuator is in a second state.

10. An improved apparatus for regulating air flow between a cooling unit and a compartment in a refrigeration system as recited in claim 9 wherein said standoff member is affixed to at least one of said first baffle element and said second baffle element.

11. An improved apparatus for regulating air flow between a cooling unit and a compartment in a refrigeration system as recited in claim 9 wherein said actuator comprises a solenoid, said solenoid including at least one solenoid coil affixed to one of said first baffle element and said second baffle element, and including an armature affixed to the other one of said first baffle element and said second baffle element.

12. An improved apparatus for regulating air flow between a cooling unit and a compartment in a refrigeration system as recited in claim 10 wherein said actuator comprises a solenoid, said solenoid including at least one solenoid coil affixed to one of said first baffle element and said second baffle element, and including an armature affixed to the other one of said first baffle element and said second baffle element.

13. An air baffle apparatus for use in a refrigeration system; the apparatus comprising:
a first baffle element; said first baffle element having an array of first air passages;
a second baffle element; said second baffle element having an array of second air passages; said first baffle element and said second baffle element being slidably engaged and being slidably positionable in a plurality of positions; said first air passages and said second air passages cooperating to pass air through the apparatus when said first baffle element and said second baffle element are in a first position of said plurality of positions; said first air passages and said second air passages cooperating to substantially block air from passing through the apparatus when said first baffle element and said second baffle element are in a second position of said plurality of positions;
an actuator coupled with said first baffle element and with said second baffle element for slidably positioning said first baffle element and said second baffle element, said actuator having an actuated state and an idle state; and
a standoff structure for establishing a predetermined separation distance between said first baffle element and said second baffle element proximal to said standoff structure, said first baffle element and said second baffle element being in substantially adjoining relation distal from said standoff structure when said actuator is in said idle state, and said first baffle element and said second baffle element being substantially said separation distance apart distal from said standoff structure when said actuator is in said actuated state.

14. An air baffle apparatus for use in a refrigeration system as recited in claim 13 wherein said standoff structure is affixed to at least one of said first baffle element and said second baffle element.

15. An air baffle apparatus for use in a refrigeration system as recited in claim 13 wherein said standoff structure is integral with at least one of said first baffle element and said second baffle element.

16. An air baffle apparatus for use in a refrigeration system as recited in claim 13 wherein said actuator comprises a solenoid, said solenoid including at least one solenoid coil affixed to one of said first baffle element and said second baffle element, and including an armature affixed to the other one of said first baffle element and said second baffle element.

17. An air baffle apparatus for use in a refrigeration system as recited in claim 14 wherein said actuator comprises a solenoid, said solenoid including at least one solenoid coil affixed to one of said first baffle element and said second baffle element, and including an armature affixed to the other one of said first baffle element and said second baffle element.

18. An air baffle apparatus for use in a refrigeration system as recited in claim 15 wherein said actuator comprises a solenoid, said solenoid including at least one solenoid coil affixed to one of said first baffle element and said second baffle element, and including an armature affixed to the other one of said first baffle element and said second baffle element.

19. An apparatus for regulating air flow within a refrigeration device; the apparatus being interposed intermediate a cooling unit and a compartment within said refrigeration device; the apparatus being selectively positionable in an open position or in a closed position; said open position allowing air flow from said cooling unit to said compartment; said closed position substantially blocking said air flow; the apparatus comprising:

a first flow control member for controlling said air flow; said first flow control member having at least one first passage traversing said first flow control member; said first flow control member presenting a first surface; said at least one first passage intersecting said first surface to establish at least one first aperture;

a second flow control member for controlling said air flow; said second flow control member having at least one second passage traversing said second flow control member; said second flow control member presenting a second surface; said at least one second passage intersecting said second surface to establish at least one second aperture;

a control unit for controlling operation of the apparatus;

said control unit having an idle state and an actuated state and being responsive to a control signal to orient the apparatus in said open position or said closed position;

said first flow control member and said second flow control member being in substantially adjacent relation with said first surface and said second surface being in facing relation; at least one of said first flow control member and said second flow control member having a standoff structure for maintaining a predetermined separation between said first flow control member and said second flow control member proximal to said standoff structure; said first flow control member and said second flow control member being separated a distance less than said predetermined distance distal from said standoff structure when said control unit is in said idle state, and said first flow control member and said second flow control member being separated substantially said predetermined distance distal from said standoff structure when said control unit is in said actuated state.

* * * * *